US008520744B2

(12) United States Patent
Loinaz et al.

(10) Patent No.: US 8,520,744 B2
(45) Date of Patent: Aug. 27, 2013

(54) MULTI-VALUE LOGIC SIGNALING IN MULTI-FUNCTIONAL CIRCUITS

(75) Inventors: Marc Loinaz, Palo Alto, CA (US); Stefanos Sidiropoulos, Palo Alto, CA (US); Whay Sing Lee, Milpitas, CA (US)

(73) Assignee: NetLogic Microsystems, Inc., Mountain View, CA (US)

( * ) Notice: Subject to any disclaimer, the term of this patent is extended or adjusted under 35 U.S.C. 154(b) by 611 days.

(21) Appl. No.: 12/728,113

(22) Filed: Mar. 19, 2010

(65) Prior Publication Data

US 2011/0228860 A1 Sep. 22, 2011

(51) Int. Cl.
*H04B 3/00* (2006.01)

(52) U.S. Cl.
USPC ............................ 375/257; 375/222; 375/288

(58) Field of Classification Search
USPC ................ 375/257, 222, 288, 357; 370/69.1; 710/100, 1, 69, 110; 326/30
See application file for complete search history.

(56) References Cited

U.S. PATENT DOCUMENTS 3,601,543 A 8/1971 Maniere et al.
4,110,558 A 8/1978 Kageyama et al.
4,314,212 A 2/1982 Gradl
4,507,629 A 3/1985 Frank
4,586,010 A 4/1986 Linnenbrink
4,621,242 A 11/1986 Theall et al.
5,124,670 A 6/1992 Lawton
5,471,162 A 11/1995 McEwan
5,519,342 A 5/1996 McEwan
5,559,474 A 9/1996 Matsumoto et al.
5,712,583 A 1/1998 Frankeny
5,712,882 A 1/1998 Miller
5,864,250 A 1/1999 Deng
6,125,157 A 9/2000 Donnelly et al.
6,167,467 A 12/2000 Itoh et al.
6,226,332 B1 5/2001 Agazzi et al.
6,242,990 B1 6/2001 Sokolov
6,266,722 B1 * 7/2001 Ogura ........................... 710/100
6,285,726 B1 9/2001 Gaudet
6,317,008 B1 11/2001 Gabara
6,466,098 B2 10/2002 Pickering
6,535,043 B2 3/2003 Chen
6,570,946 B1 5/2003 Homol et al.
6,631,144 B1 10/2003 Johansen (Continued)

OTHER PUBLICATIONS

U.S. Appl. No. 11/781,712, filed Jul. 23, 2009, Sidiropoulos, et al.

(Continued)

*Primary Examiner* — Shuwang Liu
*Assistant Examiner* — Helene Tayong
(74) *Attorney, Agent, or Firm* — Sterne, Kessler, Goldstein & Fox P.L.L.C.

(57) ABSTRACT

Methods and circuits provide function-appropriate signaling to multi-functional circuits on a constrained set of communication lines. A first communication line receives digital signals. The second communication line is employed for digital signaling related to a first function. In further steps, the method comprises initiating, based on a multi-value logic digital signal on the first communication line, an activation process that generates a second-function activation signal. Upon receipt of the second-function activation signal, the second communication line is employed for digital signaling related to a second function. Preferred activation processes involve monitoring the second communication line for a digital signature and sending the activation signal upon detection of an appropriate signature.

20 Claims, 3 Drawing Sheets

(56) References Cited

U.S. PATENT DOCUMENTS 6,650,157 B2 11/2003 Amick et al.
6,674,824 B1 1/2004 Chiueh et al.
6,693,496 B1 2/2004 Lebouleux
6,828,864 B2 12/2004 Maxim et al.
6,901,126 B1 5/2005 Gu
6,927,611 B2 8/2005 Rhee et al.
6,961,546 B1 11/2005 Rofougaran et al.
6,967,513 B1 11/2005 Balboni
6,999,543 B1 2/2006 Trinh et al.
7,005,885 B1 2/2006 Feldman
7,054,404 B2 5/2006 Saeki
7,065,666 B2 6/2006 Janzen
7,078,946 B2 7/2006 van der Valk et al.
7,088,534 B2 8/2006 Sutardja
7,089,444 B1 8/2006 Asaduzzaman et al.
7,161,443 B2 1/2007 Chen
7,162,002 B2 1/2007 Chen et al.
7,233,170 B2 6/2007 Becker et al.
7,317,360 B2 1/2008 Keaveney
7,323,916 B1 1/2008 Sidiropoulos et al.
7,432,750 B1 10/2008 Sidiropoulos et al.
7,436,229 B2 10/2008 Sidiropoulos et al.
7,443,215 B1 10/2008 Sidiropoulos
7,532,697 B1 5/2009 Sidiropoulos et al.
7,679,345 B1 3/2010 Verma et al.
7,849,348 B1 12/2010 Sidiropoulos et al. ........ 713/500
2001/0043649 A1 11/2001 Farjad-Rad
2003/0081709 A1 5/2003 Ngo et al.
2003/0086501 A1 5/2003 Dreps et al.
2003/0091139 A1 5/2003 Cao
2003/0161430 A1 8/2003 Sou
2003/0182481 A1 9/2003 Schoenborn
2004/0202266 A1 10/2004 Gregorius et al.
2005/0111843 A1 5/2005 Takeuchi et al.
2006/0023602 A1 2/2006 Rauschmayers
2008/0049850 A1 2/2008 Sidiropoulos et al.
2008/0260071 A1 10/2008 Sidiropoulos et al.
2010/0164445 A1 7/2010 Verma et al.
2010/0251543 A1* 10/2010 Hoang ............................ 29/832

OTHER PUBLICATIONS

U.S. Appl. No. 12/728,101, filed Mar. 19, 2010, Loinaz, Marc J.
U.S. Appl. No. 10/176,495, filed Jun. 21, 2002, Sidiropoulos, Office Action dated Oct. 14, 2011.
U.S. Appl. No. 12/728,129, filed Mar. 19, 2010, Liu et al.
U.S. Appl. No. 12/185,750 filed Aug. 4, 2008, Stefanos Sidiropoulos.
U.S. Appl. No. 12/828,125 filed Jun. 30, 2010, Cirit, Halil.
U.S. Appl. No. 12/728,153, filed Jun. 30, 2010, Cirit, Halil.
Sidiropoulos et al., Adaptive Bandwidth DLLs and PLLs using Regulated Supply CMOS Buffers, 2000 Symposium on VLSI Circuits Digest of Technical Papers.
Mansuri et al., A Low-Power Low-Jitter Adaptive-Bandwidth PLL and Clock Buffer, ISSCC 2003/Session 24/Clock Generation/Paper 24.5, ISSCC 2003/Feb. 12, 2003/Salon 8/ 3:45PM, 2003 IEEE International Solid-State Circuits Conference.
Mansuri et al. Jitter Optimization Based on Phase-Locked Loop Design Parameters, IEEE Journal of Solid-State Circuits, vol. 37, No. 11, Nov. 2002.
Maxim et al., A Low-Jitter 125-1250-MHz Process-Independent and Ripple-Poleless 0.18-μm CMOS PLL Based on a Sample-Reset Loop Filter, IEEE Journal of Solid-State Circuits, vol. 36, No. 11, Nov. 2001.
Maneatis, Self-Biased High-Bandwidth Low-Jitter 1-to-4096 Multiplier Clock Generator PLL, IEEE Journal of Solid-State Circuits, vol. 38, No. 11, Nov. 2003.
Sidiropoulos, A Semidigital Dual Delay-Locked Loop, IEEE Journal of Solid-State Circuits, vol. 32, No. 11, Nov. 1997.
U.S. Appl. No. 10/176,495, filed Jun. 21, 2002, Sidiropoulos et al., Office Action dated Mar. 30, 2011.
U.S. Appl. No. 11/930,978, filed Oct. 31, 2007, Sidiropoulos et al., Office Action dated Mar. 18, 2011.

* cited by examiner

MULTI-VALUE LOGIC SIGNALING IN MULTI-FUNCTIONAL CIRCUITS

BACKGROUND OF THE INVENTION

1. Field of the Invention

The present invention is directed toward the field of multi-functional circuits.

2. Art Background

In electronics applications, specifications of circuits and circuit packages are often defined by standards bodies or multi-source agreements. Current standardized modules include main memory, e.g. dual-data rate or dual-data rate 2 dual inline memory modules, where standards are defined by the Joint Electron Devices Engineering Council.

Many existing integrated circuit products currently employ pin-out assignments constrained by such industrial standards, such as JEDEC standards. Integration of new features into such products is complicated by input and output requirements of the features, such as access and control, which would normally require modification of the pin layout of the integrated circuit. Examples of such features include new configuration and diagnostic capabilities.

DETAILED DESCRIPTION

The following detailed description sets forth embodiments consistent with an invention that provides multi-functional circuits with function-appropriate signaling.

Method

Figure 1:
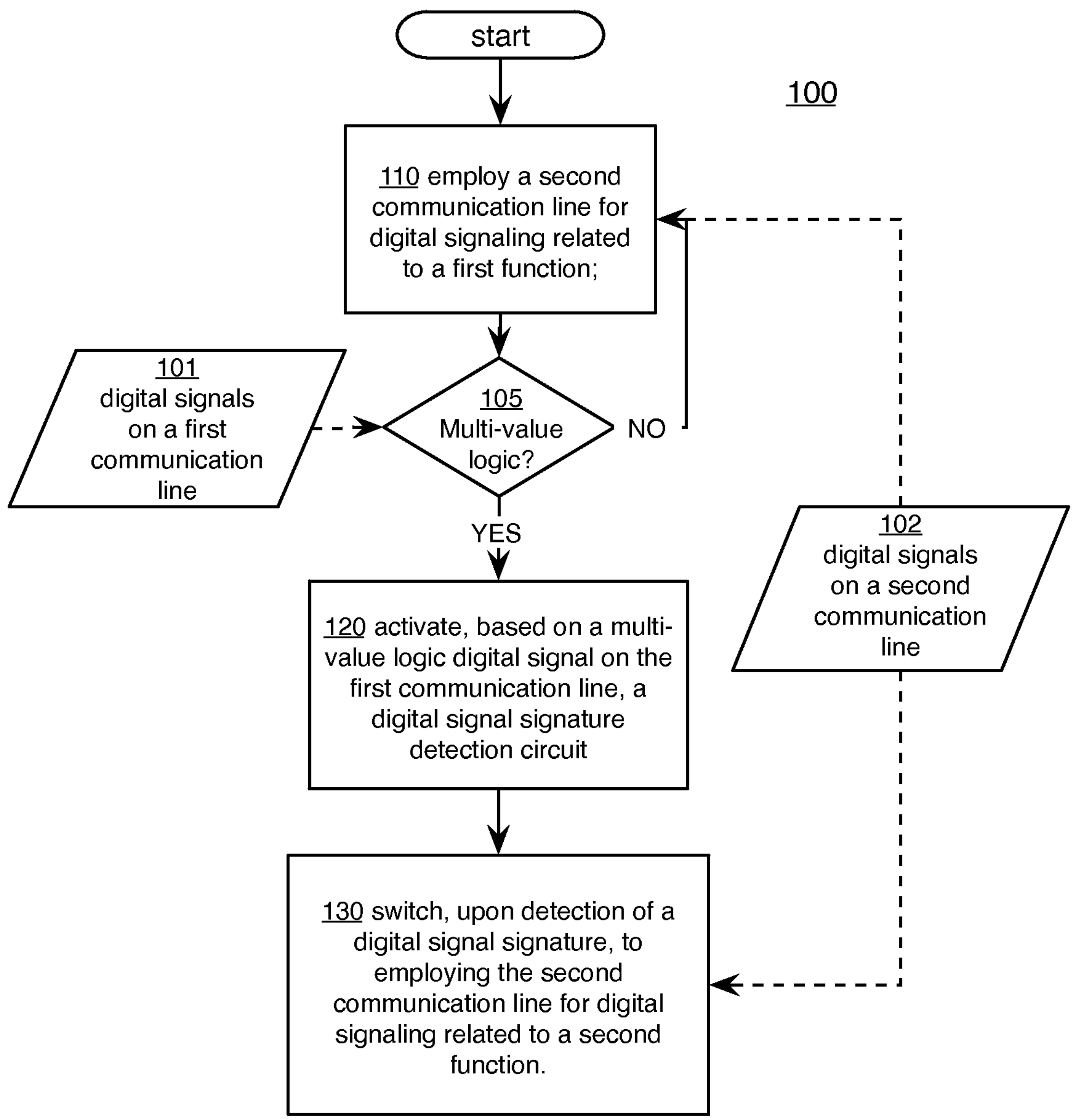
FIG. 1 is a flow chart of a method of employing a set of communication lines to provide function-appropriate signaling capability consistent with some embodiments of the present invention.

FIG. 1 illustrates a method consistent with some embodiments of the invention. The method 100 seeks to provide multi-functional circuits with function-appropriate signaling over a set of communication lines, including a first communication line and a second communication line. Initially, the process 110 employs the second communication line for digital signaling related to a first function. Upon receiving digital signals on the first communication line 101, a process determines whether the signals comprise multi-value logic at a decision point 105. If multi-value logic is present, a process 120 activates, based on the multi-value logic digital signal on the first communication line, a digital signal signature detection circuit. Then upon detection 130 of a digital signal signature, the process switches to employing the second communication line for digital signaling related to a second function. During the method, digital signals 102 on the second communication line are employed by the appropriate function circuit.

Structure

Preferably, within some embodiments of the present invention, a binary-logic input pin is selected from a constrained pin map, and a multi-value logic receiver is instantiated instead within the chip for said pin. Within the disclosure, multi-value logic refers to logic with more than two logic states. For example, 0, 1, and p, corresponding to voltage levels of low, high and medium, may be applied to an input pin. A multi-value logic receiver is able to distinguish among the three or more logic states.

Figure 2:
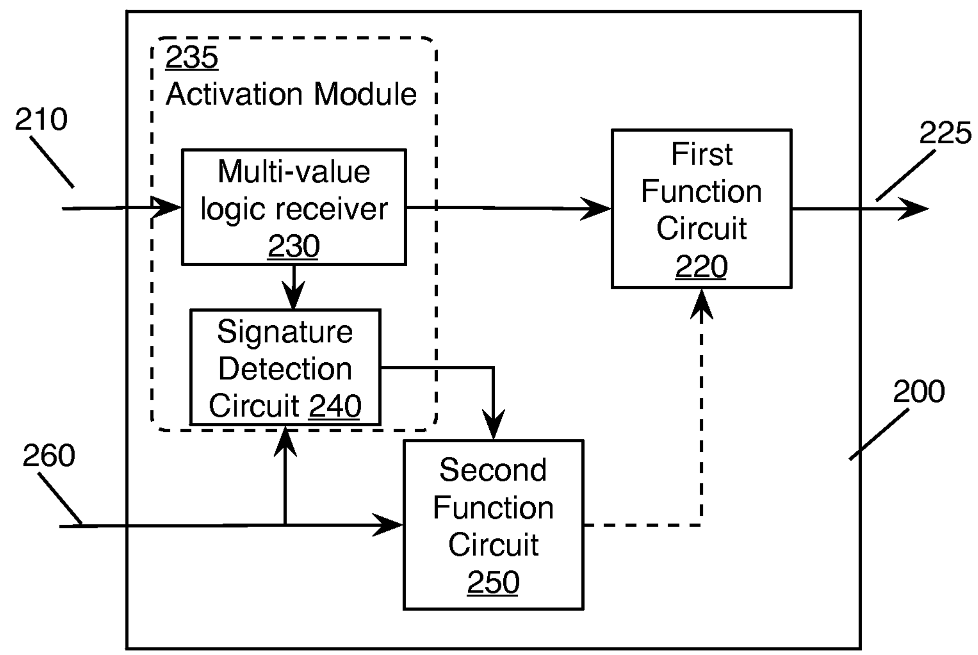
FIG. 2 is a block diagram of a multi-functional electronic circuit employing a set of communication lines to provide function-appropriate signaling capability consistent with some embodiments of the present invention.

FIG. 2 illustrates an electronic apparatus providing multiple electronic circuit functionality using multi-value logic signal activation with a signature detection circuit. The electronic circuit 200 consists of a first communication line 210, a first function circuit 220, an activation module 235, a second function circuit 250, and a second communication line 260. Consistent with some embodiments, an activation module comprises multiple elements. FIG. 2 shows the activation module 235 comprising a multi-value logic receiver 230 and a signature detection circuit 240.

The first function circuit 220 performs the first function. In some embodiments the first function is a function an electronic circuit package was originally designed to execute, and the function that constrains the pin-out of the circuit package.

The activation module 235 receives input signals from the first communication line 210. Preferably, when receiving a binary signal, the activation module 235 transmits the binary signal to first function circuit 220. When receiving a multi-value logic signal, such as a ternary logic signal, the activation module 235 detects the multi-value logic signal and begins to monitor activity on the second communication line 260. Once the activation module observes an appropriate signature on the second communication line 260, the activation module 235 transmits an activation signal to the second function circuit 250, which proceeds to employ the second communication line for signaling related to the second function. Preferably, the activation module 235 also functions to deactivate the second function circuit 250. For example, in some embodiments the activation module 235 transmits a deactivation signal to the second function circuit 250 when receiving either logic 0 or 1 from the first communication line 210 and transmits the binary signal to the first function circuit 220. Activity of the first function circuit 220 resumes and the electronic circuit 200 reverts to first functionality.

In one embodiment, the functions of the activation module 235 are carried out by the multi-value receiver 230 and the signature detection circuit 240. The multi-value logic receiver 230 receives input signals from the first communication line 210. The receiver 230 is able to distinguish among three or more logic states, e.g. 0, 1, and logic state p, applied to the first communication line 210. The receiver 230 is coupled to the signature detection circuit 240 and the first function circuit 220. Preferably, when receiving a binary signal, the receiver 230 transmits the binary signal to first function circuit 220. When receiving a multi-value logic signal, such as a ternary logic signal, the receiver 230 detects the multi-value logic signal and transmits an activation signal to the signature circuit 240, activating the signature circuit 240. Preferably, the receiver 230 also functions to deactivate the signature circuit 240, for example in some embodiments the receiver 230 transmits a deactivation signal to the signature circuit 240 when receiving either logic 0 or 1 from the first communication line 210 and transmits the binary signal to the binary circuit 220. Activity of the binary circuit 220 resumes and the electronic circuit 200 reverts to first functionality.

The signature circuit 240 is coupled to a second communication line 260 and the second function circuit 250. The signature circuit 240 receives an activation signal from the receiver 230, triggering the signature circuit 240 to monitor activity on the second communication line 260. Once observed on the second communication line 260, a signature is compared against at least one coded signature within the signature circuit 240. With a valid signature and the activation signal from the receiver 230, the signature circuit 240 transmits the activation signal to the second function circuit 250. When the signature circuit 240 receives a deactivation signal from the receiver 230, the signature circuit 240: transmits a deactivation signal to the second function circuit. and reverts to monitoring the second communication line for the next occurrence of the activation signature; and transmits the deactivation signal to the second function circuit 250.

The second function circuit 250 is activated when receiving the activation signal from the signature circuit 240. Activation of the second function circuit 250 switches the first functionality of the electronic circuit 200 for the second functionality. In the preferred embodiment, the second function circuit switches the functionality of the second communication line 260. The second functionality of the electronic circuit 200 may be subsequently deactivated when the second function circuit receives a deactivation signal from the signature circuit 240.

Figure 3:
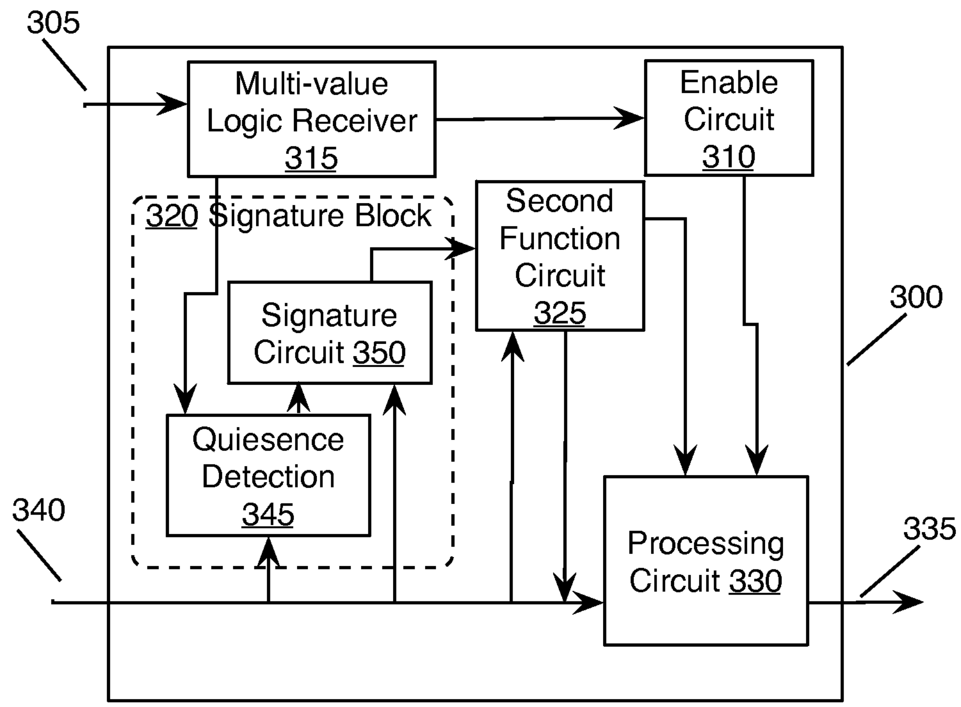
FIG. 3 is a block diagram of a multi-functional electronic circuit including PLL function employing a set of communication lines to provide function-appropriate signaling capability consistent with some embodiments of the present invention.

An exemplary embodiment of the current invention is described with reference to FIG. 3, involving a program-enable scheme consistent with some embodiments of the present invention and amenable for use with circuits governed by specification. The circuit 300 includes elements that permit multiple functions using multi-value logic signal activation with a signature detection circuit. The electronic circuit 300 (hereinafter also referred to as "processing circuit") consists of a first communication line 305, an output enable logic circuit (hereinafter also referred to as "enable circuit") 310, a multi-value logic receiver 315, a signature activation circuit block (hereinafter also referred to as "signature block") 320, a second function circuit 325, a processing circuit 330, a clock output 335, and a second communication line 340. Legacy elements of a specified circuit might include the processing circuit 330 and the output enable logic 310.

The enable circuit 310 is coupled to the first communication line 305 and the processing circuit 330. As understood within the disclosure, the term "coupled" is interpreted and construed broadly to mean to electrically connect two or more electronic circuits, either through a direct electrical connection or indirectly through another circuit. The enable circuit 310 receives a binary signal from the receiver 315 and generates an output signal to the clock circuit 330, which controls enabling or disabling the processing circuit 330. The enable circuit 310 receives a signal to disable the processing output 330 when either a logic 0 or logic state p is received from the receiver 315.

The receiver 315 is coupled to the signature block 320 and the enable circuit 310. The receiver 315 receives an input signal from the first communication line 305. The receiver 315 distinguishes among three or more logic states including: 0, 1, and the logic state p, received by the first communication line 305. The receiver 315 transmits a signal to the enable circuit 310, disabling the clock circuit 330 when either a logic 0 or logic state p is received from the first communication line 305. The multi-value logic signal triggers the receiver 315 to transmit the activation signal to the signature block 320.

When the multi-level receiver 315 receives a binary signal from the first communication line 305, the receiver 315 transmits a deactivation signal to the signature block 320 when receiving either logic 0 or 1 from the first communication line 305 and transmits the binary signal to the enable circuit 310. The PLL circuit 300 reverts to first functionality and is enabled or disabled under the control of the enable circuit 310, in accordance to the logic 0 or 1 received.

The signal activation block 320 is coupled to the second function circuit 325 and the second communication line 340. The signal activation block 320 receives an activation signal from the multi-value logic receiver 315 and monitors signal activity from a second communication line 340 for the signature. The signature block 320 couples to a second communication line 340 and the second function circuit 325. The signature block 320 receives an activation signal from the receiver 315, triggering the signature block 320 to monitor activity on the second communication line 340. When the signature is observed on the second communication line 340 and the activation signal from the receiver 315 is received, the signature block 320 transmits the activation signal to the second function circuit 325.

When the signature block 320 receives the deactivation signal from the receiver 315, the signature block 320 discontinues activity monitoring of the second communication line 340 and transmits the deactivation signal to the second function circuit 325.

In the preferred embodiment, the signature block 320 may comprise a quiescence detection circuit 345 (hereinafter also referred to as "quiescence circuit") and a signature circuit 350. The quiescence circuit 345 receives the activation signal from the receiver 315, which triggers monitoring the second communication line 340 for a specified period of inactivity and sends an enabling signal to the signature circuit 350 when the specified period of inactivity is exceeded. The signature circuit 350 receives the enabling signal from the quiescence circuit 345, triggering monitoring on the second communication line 340 for a specified signature. The activity on the second communication line 340 is preferably compared against at least one signature coded within the signature circuit 350. The signature on the second communication line 340, in conjunction with the enabling signal from the quiescence circuit 345, triggers transmission of the activation signal to the second function circuit 325.

A second function circuit 325 may enable transmission of extended configuration information to the clock circuitry 330. The second function circuit 325 is coupled to the clock circuit 330 and the second communication line 340. When the second function circuit 325 receives the activation signal from signature block 320 and enables the second communication line 340 to perform a second functionality. Once activated, the second function circuit 325 may be controlled via the second communication line 340. The second communication line 340 may take on a second functionality including reversing the signal direction.

The second communication line 340 may originally been used to supply a reference clock or data to the processing circuit 330. The second communication line 340 may be reconfigured to communicate with the signature block 350, as well as the second function circuit 325, in addition to the executing the first functionality. Examples of first functionalities consistent with embodiments of the present invention include processes such as data buffering or clock generation.

Figure 4:
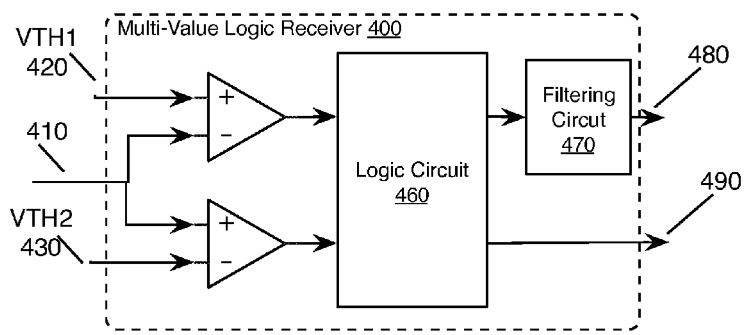
FIG. 4 is a block diagram of a multi-value logic receiver element of a multi-functional electronic circuit consistent with some embodiments of the present invention.
Figure 5A:
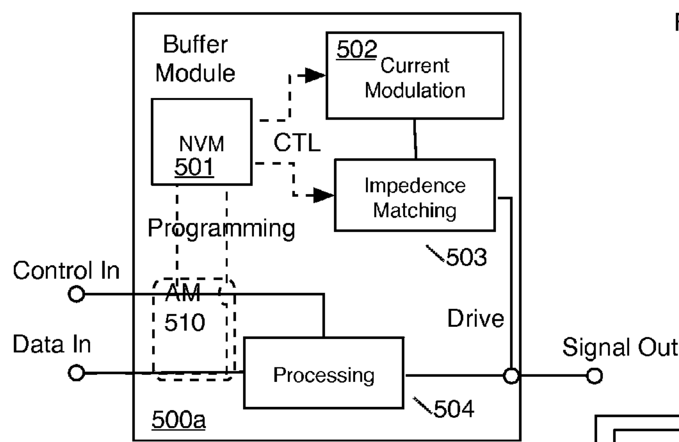
FIG. 5*a* is a block diagram of a memory register IC incorporating programmable signal strength consistent with some embodiments of the present invention.
Figure 5B:
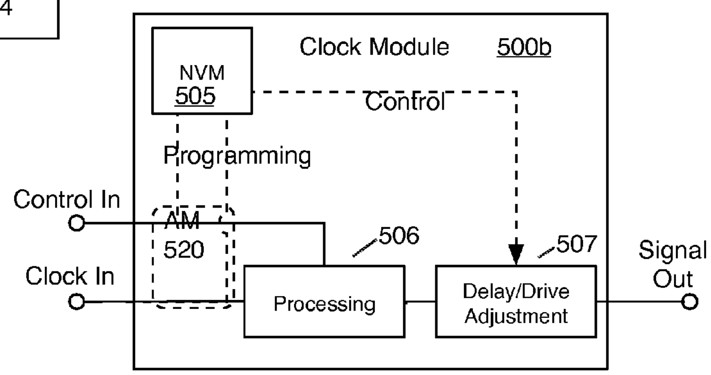
FIG. 5*b* is a block diagram of a clock generator IC incorporating programmable signal strength consistent with some embodiments of the present invention.

FIG. 4 illustrates a preferred embodiment of an electronic multi-value logic receiver consistent with some embodiments. The multi-value logic detector 400 consists of an input 410, a first comparator input voltage 420 (hereinafter also referred to as "VTH1"), a second comparator voltage 430 (hereinafter also referred to as "VTH2"), a first comparator 440, a second comparator 450, a logic circuit 460, a filtering circuit 470, a filtering circuit output 480, and a logic circuit output 490. The first comparator 440 receives input signals from the input 410 and VTH1 420. The second comparator 450 receives input signals from the input 410 and VTH2 430. The first comparator 440 compares voltage from the input 410 with VTH1 420 and sends a signal to the logic circuit 460 indicating whether the input voltage is higher or lower than VTH1 420. The second comparator 450 compares voltage from the input 410 with VTH2 430 and sends a signal to the logic circuit 460 indicating whether the input voltage is higher or lower than VTH2 430.

The logic circuit 460 processes the signal from the first comparator 440 and second comparator 450 to detect the presence of a multi-value logic input signal. Using appropriate values of VTH1 420 and VTH 530, the logic circuit 460 is designed to take the outputs of the first comparator 440 and second comparator 450 to produce a multi-value logic signal when the voltage on the input 410 is between 420 and VTH2 430. When receiving a binary signal on the input 410, the logic circuit 460 generates a buffered binary signal on the logic circuit output 490. Preferably the logic circuit 460 is implemented in CMOS logic, which allows reconstruction of either binary or multi-value signal through use of binary logical operations.

The input 410 is a binary input in the original electronic circuit, the input 410 toggles between logic 1 and logic 0 in the course of its normal operation. The filtering circuit 470 prevents inadvertent spikes of the logic state p signal when the input 410 is transitioning from logic 0 to 1 or logic 1 to 0. When the input 410 is held at logic state p for a specified period of time, the filtering circuit 470 transmits logic state p signal on the filter circuit output 480.

The preferred embodiment of the multi-value logic detector produces an output based on logic state p voltage between logic 0 and 1. Optionally, the multi-value logic detector 400 may be designed to detect a multi-value logic state either above or below logic 0 or logic 1 voltages. Further, a multi-value logic detector such as the detector 400 may detect more than three logic states.

FIG. **5*a* illustrates a functional/block diagram of a programmable data buffer 500*a* consistent with some embodiments of the present invention. The programmable data buffer 500*a* is preferably implemented in a single IC and comprises a non-volatile memory (NVM) 501, an activation module (AM) 510, a current modulation module 502, an impedance matching module 503, and a processing module 504**. In some embodiments the circuit is implemented in more than one IC.

In a first function, the processing module 504 receives data through the Data In input and control through a Control In input. Signals on the Control In and Data In inputs are monitored by the AM 510 and passed to the processing module 504, which processes the data, as regulated by the control, and outputs a signal. The current modulation 502 and impedance matching 503 modules receive control inputs from the NVM 501 based on control values stored in the NVM and produce a Drive signal. The buffer **500*a* outputs a data signal based on the output of the processing module 504** and the Drive signal.

In a second function, values on the Control In trigger an activation process in the AM 510 that uses signals on the Data In input. Following activation, signals from the Data In and Control In inputs are directed to the NVM 501 and used to store control values within the NVM 501. Preferably the control values stored during the second function are then subsequently used during a first function.

FIG. **5*b* illustrates a functional/block diagram of a programmable clock generator 500*a*** consistent with some embodiments of the present invention. Preferably the clock generator is a clock chip governed by a JEDEC specification.

The programmable clock generator **500*b* is preferably implemented in a single IC and comprises a non-volatile memory 505, an activation module (AM) 520, a processing module 506, a delay/drive adjustment module 507, and a processing module 514**. In some embodiments the circuit is implemented in more than one IC.

In a first function, the processing module 506 receives a reference clock through the Clock In input and control signals through the Control In input. Signals on the Control In and Clock In inputs are monitored by the AM 520 and passed to the processing module 506, which processes the clock according to the control inputs and outputs a clock signal. The delay/drive adjustment module 507 receives control inputs from the NVM 505 based on control values stored in the NVM and adjust the clock signal produced by the processing module 506. The clock generator **500*b* outputs a clock signal based on the output of the processing module 506 as modified by the delay/drive adjustment module 507**.

In a second function, values on the Control In trigger an activation process in the AM 520 that uses signals on the Clock In input. Following activation, signals from the Data In and Control In inputs are directed to the NVM 505 and used to store control values within the NVM 505. Preferably the control values stored during the second function are then subsequently used during a first function.

Advantages

Embodiments of the current invention may be used to add new features to legacy products, or to economize on the number of pins required in a new product. Examples of such new functionalities include, but are not limited to: programmable non-volatile configuration states; advanced diagnostics and statistics collection; other features, such as covert data capture.

Embodiments of the current invention enable the addition of new functionalities to a chip without modifying the existing pin map, by using a multi-value logic receiver. In addition, embodiments avoid problems of noise on the input pin, which are foreseeable such a receiver is used in a legacy environment that was not specifically designed to drive multi-value logic. Embodiments that incorporate signature detection mitigate inadvertent activation of the second function in the presence of random noise.

Further, embodiments of the current invention are advantageous over solutions where extra functional logic is activated when a predetermined sequence of binary transitions is detected on selected pins. With binary logic, in order to avoid inadvertent activation of the extra function, the designer must choose a sequence that is guaranteed to never occur during normal operation of the device in a legacy environment, which may be difficult.

Although the present invention has been described in terms of specific exemplary embodiments, it will be appreciated that various modifications and alterations might be made by those skilled in the art without departing from the spirit and scope of the invention. The scope of the invention is not limited to the exemplary embodiments described and should be ascertained by inspecting the appended claims.

What is claimed is:

1. A method comprising:

receiving a digital signal on a first pin of an integrated circuit;

employing a second pin of the integrated circuit for digital signaling related to a first function during a first mode of operation;

activating a digital signal signature detection circuit in response to the received digital signal on the first pin being a multi-value logic digital signal;

detecting a digital signal signature from the digital signal signature detection circuit; and employing, in response to the detecting the digital signal signature, the second pin for digital signaling related to a second function associated with a second mode of operation, different than the first mode of operation, wherein the pins of the integrated circuit are configured based on an industrial standard specifying the function of the pins when the second function is not employed.

2. The method of claim 1, wherein activating comprises monitoring the first pin for the multi-value logic digital signal.

3. The method of claim 1, wherein, upon receiving the multi-value logic digital signal on the first pin, sending an activation signal to the digital signal signature detection circuit.

4. The method of claim 1, further comprising monitoring the second pin for the digital signal signature.

5. The method of claim 1, wherein the multi-value logic digital signal strength falls between a minimum binary signal strength and a maximum binary signal strength.

6. The method of claim 1, wherein the multi-value logic digital signal strength falls below a minimum binary signal strength or above a maximum binary signal strength.

7. The method of claim 1, wherein employing the second pin for digital signaling is related to the first function if the digital signal signature is not detected.

8. The method of claim 1, further comprising reverting, upon detection of a deactivation digital signal on the first pin, to employing the second pin for digital signaling related to the first function.

9. The method of claim 1, wherein the integrated circuit further comprises a memory device.

10. An integrated circuit comprising a pin layout based on an industrial standard that specifies a function of each pin of the integrated circuit, the integrated circuit comprising:

binary logic circuit configured to receive input on a first pin as binary signaling;

a first function circuit configured to receive data on a second pin related to a first function activation signal;

an activation portion configured to monitor the first pin for multi-value logic signaling of activation;

the activation portion further configured to generate a second function activation signal upon detection of the multi-value logic signaling of activation; and a second function circuit configured to receive the second function activation signal and to employ the second pin for digital signaling related to a second function, different than the first function.

11. The integrated circuit of claim 10, wherein the activation portion comprises a multi-value logic receiver configured to monitor the first pin for multi-value logic signaling, and, upon detection of multi-value logic signaling on the first pin, to generate a signature activation signal.

12. The integrated circuit of claim 11, wherein the multi-value logic receiver comprises a first comparator, which takes a first threshold voltage and a first input as inputs, and a second comparator, that takes a second threshold voltage and a second input as inputs.

13. The integrated circuit of claim 10, wherein the activation portion comprises a signature detection circuit configured to receive the signature activation signal from the multi-value logic receiver, to monitor the second pin for a digital signal signature, and, upon detection of the digital signal signature, to generate the second function activation signal.

14. The integrated circuit of claim 13, wherein the signature detection circuit comprises a quiescence detection element.

15. The integrated circuit of claim 13, wherein the signature detection circuit comprises a password detection element.

16. The integrated circuit of claim 10, wherein the second function circuit activates upon receiving the second function activation signal.

17. The integrated circuit of claim 10, wherein the activation portion is further configured to monitor the first pin for multi-value logic signaling of deactivation, and subsequently to deactivate the second function circuit.

18. The integrated circuit of claim 10, wherein the first function is clock generation.

19. The integrated circuit of claim 10, wherein the first function circuit comprises a phase-locked loop.

20. The integrated circuit of claim 10, further comprising a memory device.

* * * * *